(12) United States Patent
Henninger et al.

(10) Patent No.: US 12,433,517 B2
(45) Date of Patent: Oct. 7, 2025

(54) DEVICES, SYSTEMS, AND METHODS FOR CALIBRATING AN OPTICAL MEASUREMENT DEVICE

(71) Applicant: HI LLC, Los Angeles, CA (US)

(72) Inventors: Michael Henninger, Austin, TX (US); Ryan Field, Culver City, CA (US); Han Yong Ban, Los Angeles, CA (US)

(73) Assignee: HI LLC, Culver City, CA (US)

( * ) Notice: Subject to any disclaimer, the term of this patent is extended or adjusted under 35 U.S.C. 154(b) by 915 days.

(21) Appl. No.: 17/665,821

(22) Filed: Feb. 7, 2022

(65) Prior Publication Data

US 2022/0265174 A1    Aug. 25, 2022

Related U.S. Application Data

(60) Provisional application No. 63/190,153, filed on May 18, 2021, provisional application No. 63/151,273, filed on Feb. 19, 2021.

(51) Int. Cl.
*A61B 5/1495* (2006.01)
*A61B 5/1455* (2006.01)

(52) U.S. Cl.
CPC ........ *A61B 5/1495* (2013.01); *A61B 5/14552* (2013.01); *A61B 2560/0233* (2013.01)

(58) Field of Classification Search
CPC . A61B 5/1495; A61B 5/14552; A61B 5/1455; A61B 2560/0223;

(Continued)

(56) References Cited

U.S. PATENT DOCUMENTS 5,853,370 A    12/1998    Chance et al.
6,240,309 B1    5/2001    Yamashita et al.
(Continued)

FOREIGN PATENT DOCUMENTS

WO    2018033751    2/2018

OTHER PUBLICATIONS

Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680.

(Continued)

*Primary Examiner* — Devin B Henson
(74) *Attorney, Agent, or Firm* — ALG Intellectual Property, LLC

(57) ABSTRACT

An illustrative optical measurement device includes a light source configured to emit light pulses directed at a target of a user. The optical measurement device further includes a detector configured to detect arrival times for photons of the light pulses after the photons are scattered by the target. The optical measurement device further includes a processing unit configured to determine, while the optical measurement device is being worn by the user, an instrument response function (IRF) associated with the optical measurement device. The processing unit is further configured to generate, based on the arrival times of the photons at the detector, histogram data associated with the target. The processing unit is further configured to determine, based on the IRF and the histogram data, a property of the target.

28 Claims, 12 Drawing Sheets

(58) Field of Classification Search
CPC .... A61B 2560/0233; A61B 2560/0238; A61B 2560/0242

See application file for complete search history.

(56) References Cited

U.S. PATENT DOCUMENTS

| | | | |
|---|---|---|---|
| 6,384,663 B2 | 5/2002 | Cova et al. | |
| 6,640,133 B2 | 10/2003 | Yamashita | |
| 6,683,294 B1 | 1/2004 | Herbert et al. | |
| 7,356,365 B2 | 4/2008 | Schurman | |
| 7,547,872 B2 | 6/2009 | Niclass et al. | |
| 7,774,047 B2 | 8/2010 | Yamashita et al. | |
| 8,026,471 B2 | 9/2011 | Itzler | |
| 8,078,250 B2 | 12/2011 | Chen et al. | |
| 8,082,015 B2 | 12/2011 | Yodh et al. | |
| 8,543,180 B2* | 9/2013 | Bechtel | A61B 5/1455 600/323 |
| 8,633,431 B2 | 1/2014 | Kim | |
| 8,817,257 B2 | 8/2014 | Herve | |
| 9,058,081 B2 | 6/2015 | Baxter | |
| 9,076,707 B2 | 7/2015 | Harmon | |
| 9,131,861 B2 | 9/2015 | Ince et al. | |
| 9,316,735 B2 | 4/2016 | Baxter | |
| 9,401,448 B2 | 7/2016 | Bienfang et al. | |
| 9,419,635 B2 | 8/2016 | Kumar et al. | |
| 9,442,201 B2 | 9/2016 | Schmand et al. | |
| 9,529,079 B1 | 12/2016 | Droz | |
| 9,574,936 B2 | 2/2017 | Heinonen | |
| 9,946,344 B2 | 4/2018 | Ayaz et al. | |
| D817,553 S | 5/2018 | Aaskov et al. | |
| D825,112 S | 8/2018 | Saez | |
| 10,158,038 B1 | 12/2018 | Do Valle et al. | |
| 10,340,408 B1 | 7/2019 | Katnani | |
| 10,408,741 B2* | 9/2019 | Hwang | G01N 33/4925 |
| 10,424,683 B1 | 9/2019 | Do Valle | |
| 10,515,993 B2 | 12/2019 | Field et al. | |
| 10,697,829 B2 | 6/2020 | Delic | |
| 10,772,561 B2 | 9/2020 | Donaldson | |
| 10,809,796 B2 | 10/2020 | Armstrong-Muntner | |
| 10,912,504 B2 | 2/2021 | Nakaji | |
| 11,006,876 B2 | 5/2021 | Johnson | |
| 11,006,878 B2 | 5/2021 | Johnson | |
| 2007/0083097 A1 | 4/2007 | Fujiwara | |
| 2007/0197885 A1* | 8/2007 | Mah | A61B 5/14532 600/310 |
| 2009/0012402 A1 | 1/2009 | Mintz | |
| 2011/0208675 A1 | 8/2011 | Shoureshi et al. | |
| 2013/0342835 A1 | 12/2013 | Blacksberg | |
| 2014/0191115 A1 | 7/2014 | Webster et al. | |
| 2014/0217264 A1 | 8/2014 | Shepard | |
| 2014/0275891 A1 | 9/2014 | Muehlemann et al. | |
| 2015/0038811 A1 | 2/2015 | Asaka | |
| 2015/0041625 A1 | 2/2015 | Dutton | |
| 2015/0054111 A1 | 2/2015 | Niclass et al. | |
| 2015/0077279 A1 | 3/2015 | Song | |
| 2015/0150505 A1 | 6/2015 | Kaskoun et al. | |
| 2015/0327777 A1 | 11/2015 | Kostic et al. | |
| 2015/0364635 A1 | 12/2015 | Bodlovic et al. | |
| 2017/0030769 A1 | 2/2017 | Clemens et al. | |
| 2017/0052065 A1 | 2/2017 | Sharma et al. | |
| 2017/0176596 A1 | 6/2017 | Shpunt et al. | |
| 2017/0179173 A1 | 6/2017 | Mandai et al. | |
| 2017/0202518 A1 | 7/2017 | Furman et al. | |
| 2017/0281086 A1 | 10/2017 | Donaldson | |
| 2017/0363467 A1 | 12/2017 | Clemens et al. | |
| 2017/0367650 A1 | 12/2017 | Wallois | |
| 2018/0014741 A1 | 1/2018 | Chou | |
| 2018/0027196 A1 | 1/2018 | Yang et al. | |
| 2018/0039053 A1 | 2/2018 | Kremer et al. | |
| 2018/0070830 A1 | 3/2018 | Sutin et al. | |
| 2018/0070831 A1 | 3/2018 | Sutin et al. | |
| 2018/0085066 A1* | 3/2018 | Jinnouchi | A61B 5/1118 |
| 2018/0089848 A1 | 3/2018 | Yang et al. | |
| 2019/0113385 A1 | 4/2019 | Fukuchi | |
| 2019/0175068 A1 | 6/2019 | Everdell | |
| 2019/0355861 A1 | 11/2019 | Katnani | |
| 2019/0363210 A1 | 11/2019 | Do Valle | |
| 2019/0388018 A1 | 12/2019 | Horstmeyer | |
| 2020/0060542 A1 | 2/2020 | Alford | |
| 2020/0116838 A1 | 4/2020 | Erdogan | |
| 2020/0196932 A1 | 6/2020 | Johnson | |
| 2020/0253479 A1 | 8/2020 | Nurmikko | |
| 2020/0315510 A1 | 10/2020 | Johnson | |
| 2020/0337624 A1 | 10/2020 | Johnson | |
| 2020/0390358 A1 | 12/2020 | Johnson | |

OTHER PUBLICATIONS

Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888.

Contini, et al., "Photon migration through a turbid slab described by a model based on diffusion approximation. I. Theory", Appl. Opt. 36(19), 4587 (1997).

Di Sieno, et al., "Probe-hosted large area silicon photomultiplier and high-throughput timing electronics for enhanced performance time-domain functional near-infrared spectroscopy", Biomed. Opt. Express 11(11), 6389 (2020).

Fishburn, et al., "Temporal Derivative Distribution Repair (TDDR): A motion correction method for fNIRS", Neuroimage. Jan. 1, 2019; 184: 171-179. doi:10.1016/j.neuroimage.2018.09.025.

Huppert, et al., "HomER: a review of time-series analysis methods for near-infrared spectroscopy of the brain", Appl. Opt. 48(10), D280 (2009).

Kienle, et al., "Improved solutions of the steady-state and the time-resolved diffusion equations for reflectance from a semi-infinite turbid medium", J. Opt. Soc. Am. A 14(1), 246 (1997).

Konugolu, et al., "Broadband (600-1350 nm) Time-Resolved Diffuse Optical Spectrometer for Clinical Use", IEEE Journal of Selected Topics in Quantum Electronics, vol. 22, No. 3, May/Jun. 2016.

Lacerenza, et al., "Wearable and wireless time-domain near-infrared spectroscopy system for brain and muscle hemodynamic monitoring", Biomed. Opt. Express 11(10), 5934 (2020).

Lange, et al., "Clinical Brain Monitoring with Time Domain NIRS: A Review and Future Perspectives", Applied Sciences 9(8), 1612 (2019).

Lange, et al., "MAESTROS: A Multiwavelength Time-Domain NIRS System to Monitor Changes in Oxygenation and Oxidation State of Cytochrome-C-Oxidase", IEEE J. Select. Topics Quantum Electron. 25(1), 1-12 (2019).

Martelli, et al., "Optimal estimation reconstruction of the optical properties of a two-layered tissue phantom from time-resolved single-distance measurements", Journal of Biomedical Optics 20(11), 115001 (Nov. 2015).

Mora, et al., "Fast silicon photomultiplier improves signal harvesting and reduces complexity in time-domain diffuse optics", Opt. Express 23(11), 13937 (2015).

Pifferi, et al., "Performance assessment of photon migration instruments: the MEDPHOT protocol", Applied Optics, 44(11), 2104-2114.

Prahl, et al., "Optical Absorption of Hemoglobin", http://omlc.ogi.edu/spectra/hemoglobin/index.html, 1999.

Re, et al., "Multi-channel medical device for time domain functional near infrared spectroscopy based on wavelength space multiplexing", Biomed. Opt. Express 4(10), 2231 (2013).

Renna, et al., "Eight-Wavelength, Dual Detection Channel Instrument for Near-Infrared Time-Resolved Diffuse Optical Spectroscopy", IEEE J. Select. Topics Quantum Electron. 25(1), 1-11 (2019).

Torricelli, et al., "Time domain functional NIRS imaging for human brain mapping", NeuroImage 85, 28-50 (2014).

Wabnitz, et al., "Depth-selective data analysis for time-domain fNIRS: moments vs. time windows", Biomed. Opt. Express 11(8), 4224 (2020).

(56) References Cited

OTHER PUBLICATIONS

Wabnitz, et al., "Performance assessment of time-domain optical brain imagers, part 1: basic instrumental performance protocol", Journal of Biomedical Optics 19(8), 086010 (Aug. 2014).
Wabnitz, et al., "Performance assessment of time-domain optical brain imagers, part 2: nEUROPt protocol", Journal of Biomedical Optics 19(8), 086012 (Aug. 2014).
Wojtkiewicz, et al., "Self-calibrating time-resolved near infrared spectroscopy", Biomed. Opt. Express 10(5), 2657 (2019).
Zucchelli, et al., "Method for the discrimination of superficial and deep absorption variations by time domain fNIRS", 2013 OSA Dec. 1, 2013 | vol. 4, No. 12 | DOI:10.1364/BOE.4.002893 | Biomedical Optics Express 2893.

* cited by examiner

DEVICES, SYSTEMS, AND METHODS FOR CALIBRATING AN OPTICAL MEASUREMENT DEVICE

RELATED APPLICATIONS

The present application claims priority under 35 U.S.C. § 119(e) to U.S. Provisional Patent Application No. 63/190,153, filed on May 18, 2021, and to U.S. Provisional Patent Application No. 63/151,273, filed Feb. 19, 2021, which applications are incorporated herein by reference in their respective entireties.

BACKGROUND INFORMATION

An optical measurement device may detect blood oxygenation levels and/or blood volume levels by measuring the change in shape of laser pulses after they have passed through target tissue, e.g., brain, muscle, finger, etc. The shape of laser pulses may include a temporal shape, as represented for example by a histogram generated by a time-to-digital converter (TDC) coupled to an output of a photodetector. To measure the change in the shape, a baseline shape of the laser pulse may be determined to calibrate the optical measurement device. The baseline shape may be based on an instrument response function (IRF) of the optical measurement device. However, the IRF may change based on various conditions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

In accordance with the systems and methods described herein, an illustrative optical measurement device may include a light source configured to emit light pulses directed at a target of a user. The optical measurement device may further include a detector configured to detect arrival times for photons of the light pulses after the photons are scattered by the target. The optical measurement device may further include a processing unit configured to determine, while the optical measurement device is being worn by the user, an instrument response function (IRF) associated with the optical measurement device. The processing unit may be further configured to generate, based on the arrival times of the photons at the detector, histogram data associated with the target. The processing unit may be further configured to determine, based on the IRF and the histogram data, a property of the target.

For example, an optical measurement device may be configured to determine optical or biological properties of a user, such as a blood oxygenation level of the user (e.g., similar to a pulse oximeter) and/or neural activity of the user. Such properties of the user may be determined based on histogram data generated by time domain-based optical measurement techniques. The histogram data may depict changes in shape of laser pulses after the laser pulses have passed through target tissue. To determine the changes, a baseline shape (e.g., IRF) of the laser pulses may be used as a comparison. However, the IRF may change during use of the optical measurement device due to changes in device properties (e.g., temperature of the device and/or device components, currents applied to device components, etc.).

Systems and methods described herein may determine an IRF dynamically (e.g., while the optical measurement device is in use), as IRFs change due to changing conditions. The IRFs may be determined based on the changes in the device properties and/or based on analysis of the histogram data. By dynamically determining IRFs, the changes in shape of the laser pulses caused by properties of the target may be more accurately determined, resulting in more accurate determinations of the target properties.

These and other advantages and benefits of the present systems and methods are described more fully herein.

Figure 1:
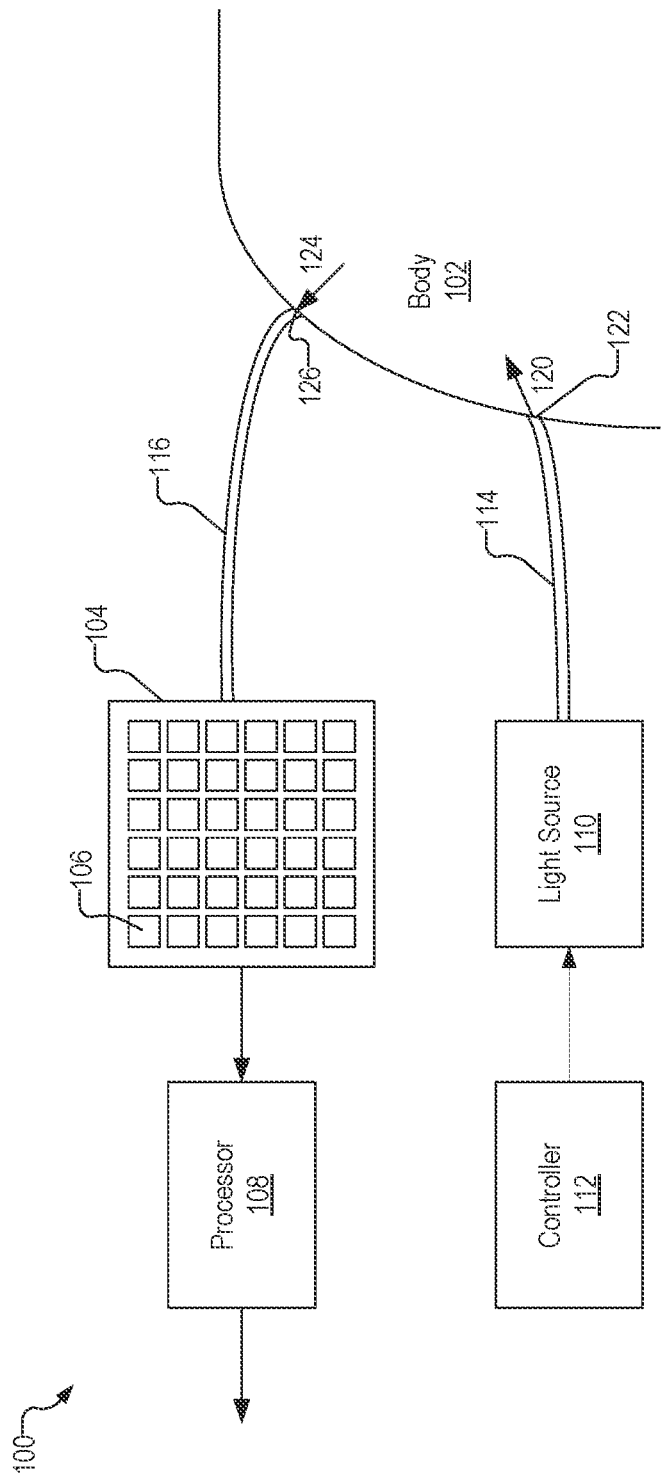
FIG. 1 illustrates an exemplary optical measurement system.

FIG. 1 shows an exemplary optical measurement system 100 configured to perform an optical measurement operation with respect to a body 102. Optical measurement system 100 may, in some examples, be portable and/or wearable by a user. Optical measurement systems that may be used in connection with the embodiments described herein are described more fully in U.S. patent application Ser. No. 17/176,315, filed Feb. 16, 2021 and published as US2021/0259638A1; U.S. patent application Ser. No. 17/176,309, filed Feb. 16, 2021 and published as US2021/0259614A1; U.S. patent application Ser. No. 17/176,460, filed Feb. 16, 2021 and issued as U.S. Pat. No. 11,096,620; U.S. patent application Ser. No. 17/176,470, filed Feb. 16, 2021 and published as US2021/0259619A1; U.S. patent application Ser. No. 17/176,487, filed Feb. 16, 2021 and published as US2021/0259632A1; U.S. patent application Ser. No. 17/176,539, filed Feb. 16, 2021 and published as US2021/0259620A1; U.S. patent application Ser. No. 17/176,560, filed Feb. 16, 2021 and published as US2021/0259597A1; U.S. patent application Ser. No. 17/176,466, filed Feb. 16, 2021 and published as US2021/0263320A1; Han Y. Ban, et al., "Kernel Flow: A High Channel Count Scalable TD-fNIRS System," SPIE Photonics West Conference (Mar. 6, 2021); and Han Y. Ban, et al., "Kernel Flow: a high channel count scalable time-domain functional near-infrared spectroscopy system," Journal of Biomedical Optics (Jan. 18, 2022), which applications and publications are incorporated herein by reference in their entirety.

In some examples, optical measurement operations performed by optical measurement system 100 are associated with a time domain-based optical measurement technique. Example time domain-based optical measurement techniques include, but are not limited to, time-correlated single-photon counting (TCSPC), time domain near infrared spectroscopy (TD-NIRS), time domain diffusive correlation spectroscopy (TD-DCS), and time domain digital optical tomography (TD-DOT).

Optical measurement system 100 (e.g., an optical measurement system that is implemented by a wearable device or other configuration, and that employs a time domain-based (e.g., TD-NIRS) measurement technique) may detect blood oxygenation levels and/or blood volume levels by measuring the change in shape of laser pulses after they have passed through target tissue, e.g., brain, muscle, finger, etc. As used herein, a shape of laser pulses refers to a temporal shape, as represented for example by a histogram generated by a time-to-digital converter (TDC) coupled to an output of a photodetector, as will be described more fully below.

As shown, optical measurement system 100 includes a detector 104 that includes a plurality of individual photodetectors (e.g., photodetector 106), a processor 108 coupled to detector 104, a light source 110, a controller 112, and optical conduits 114 and 116 (e.g., light guides, as described more fully herein). However, one or more of these components may not, in certain embodiments, be considered to be a part of optical measurement system 100. For example, in implementations where optical measurement system 100 is wearable by a user, processor 108 and/or controller 112 may in some embodiments be separate from optical measurement system 100 and not configured to be worn by the user.

Detector 104 may include any number of photodetectors 106 as may serve a particular implementation, such as $2^n$ photodetectors (e.g., 256, 512, . . . , 16384, etc.), where n is an integer greater than or equal to one (e.g., 4, 5, 8, 10, 11, 14, etc.). Photodetectors 106 may be arranged in any suitable manner.

Photodetectors 106 may each be implemented by any suitable circuit configured to detect individual photons of light incident upon photodetectors 106. For example, each photodetector 106 may be implemented by a single photon avalanche diode (SPAD) circuit and/or other circuitry as may serve a particular implementation.

Processor 108 may be implemented by one or more physical processing (e.g., computing) devices. In some examples, processor 108 may execute instructions (e.g., software) configured to perform one or more of the operations described herein.

Light source 110 may be implemented by any suitable component configured to generate and emit light. For example, light source 110 may be implemented by one or more laser diodes, distributed feedback (DFB) lasers, super luminescent diodes (SLDs), light emitting diodes (LEDs), diode-pumped solid-state (DPSS) lasers, super luminescent light emitting diodes (sLEDs), vertical-cavity surface-emitting lasers (VCSELs), titanium sapphire lasers, micro light emitting diode (m LEDs), and/or any other suitable laser or light source configured to emit light in one or more discrete wavelengths or narrow wavelength bands. In some examples, the light emitted by light source 110 is high coherence light (e.g., light that has a coherence length of at least 5 centimeters) at a predetermined center wavelength. In some examples, the light emitted by light source 110 is emitted as a plurality of alternating light pulses of different wavelengths.

Light source 110 is controlled by controller 112, which may be implemented by any suitable computing device (e.g., processor 108), integrated circuit, and/or combination of hardware and/or software as may serve a particular implementation. In some examples, controller 112 is configured to control light source 110 by turning light source 110 on and off and/or setting an intensity of light generated by light source 110. Controller 112 may be manually operated by a user, or may be programmed to control light source 110 automatically.

Light emitted by light source 110 may travel via an optical conduit 114 (e.g., a light pipe, a light guide, a waveguide, a single-mode optical fiber, and/or or a multi-mode optical fiber) to body 102 of a subject. In cases where optical conduit 114 is implemented by a light guide, the light guide may be spring loaded and/or have a cantilever mechanism to allow for conformably pressing the light guide firmly against body 102.

Body 102 may include any suitable turbid medium. For example, in some implementations, body 102 is a head, hand, wrist, finger, foot, chest, ear, or any other body part of a human or other animal. Alternatively, body 102 may be a non-living object. For illustrative purposes, it will be assumed in the examples provided herein that body 102 is a human head, human hand, human wrist, human finger, human earlobe, human foot, or human toe.

As indicated by arrow 120, light emitted by light source 110 enters body 102 at a first location 122 on body 102. Accordingly, a distal end of optical conduit 114 may be positioned at (e.g., right above, in physical contact with, or physically attached to) first location 122 (e.g., to a scalp of the subject, to the skin of the subject's hand or finger, or to any other location on body 102). In some examples, the light may emerge from optical conduit 114 and spread out to a certain spot size on body 102 to fall under a predetermined safety limit. At least a portion of the light indicated by arrow 120 may be scattered within body 102.

As used herein, "distal" means nearer, along the optical path of the light emitted by light source 110 or the light received by detector 104, to the target (e.g., within body 102) than to light source 110 or detector 104. Thus, the distal end of optical conduit 114 is nearer to body 102 than to light source 110, and the distal end of optical conduit 116 is nearer to body 102 than to detector 104. Additionally, as used herein, "proximal" means nearer, along the optical path of the light emitted by light source 110 or the light received by detector 104, to light source 110 or detector 104 than to body 102. Thus, the proximal end of optical conduit 114 is nearer to light source 110 than to body 102, and the proximal end of optical conduit 116 is nearer to detector 104 than to body 102.

As shown, the distal end of optical conduit 116 (e.g., a light pipe, a light guide, a waveguide, a single-mode optical fiber, and/or a multi-mode optical fiber) is positioned at (e.g., right above, in physical contact with, or physically attached to) output location 126 on body 102. In this manner, optical conduit 116 may collect at least a portion of the scattered light (indicated as light 124) as it exits body 102 at location 126 and carry light 124 to detector 104. Light 124 may pass through one or more lenses and/or other optical elements (not shown) that direct light 124 onto each of the photodetectors 106 included in detector 104.

Photodetectors 106 may be connected in parallel in detector 104. An output of each of photodetectors 106 may be accumulated to generate an accumulated output of detector 104. Processor 108 may receive the accumulated output and determine, based on the accumulated output, a temporal distribution of photons detected by photodetectors 106. Processor 108 may then generate, based on the temporal distribution, a histogram representing a light pulse response of a target (e.g., brain tissue, blood flow, etc.) in body 102. Example embodiments of accumulated outputs are described herein.

Figure 2:
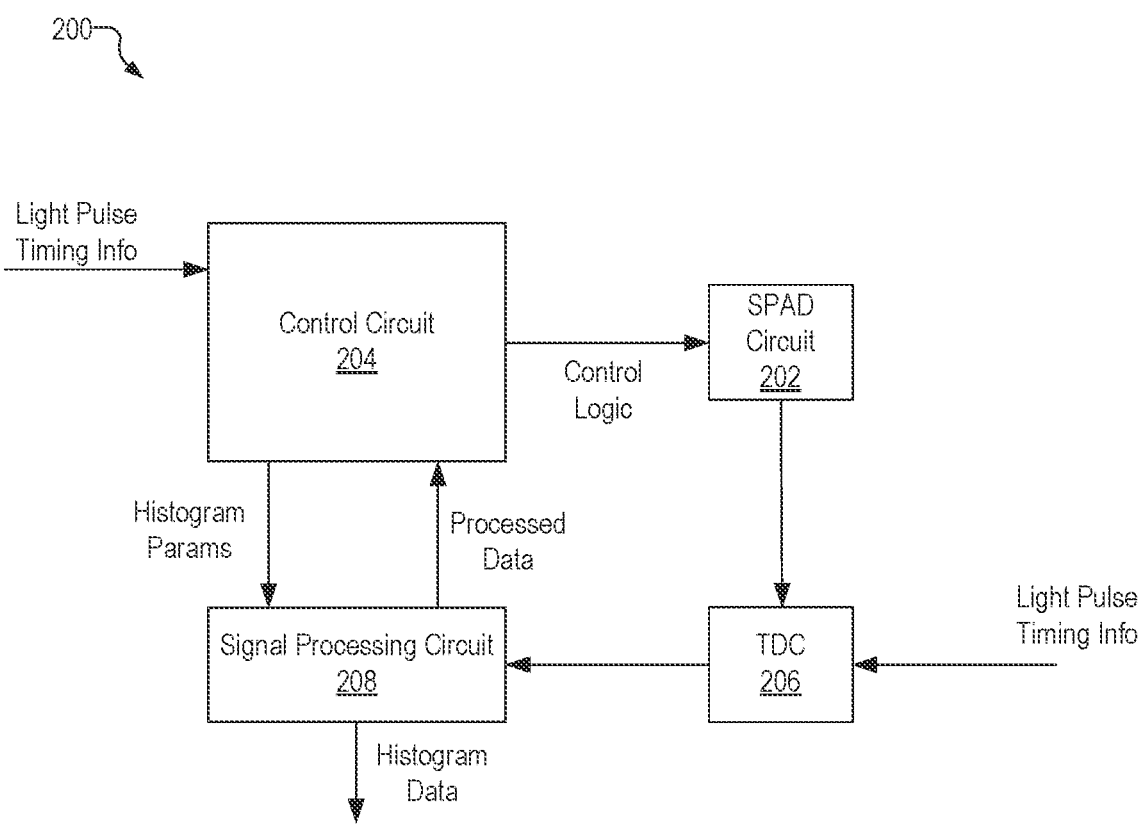
FIG. 2 illustrates an exemplary detector architecture.

FIG. 2 illustrates an exemplary detector architecture 200 that may be used in accordance with the systems and methods described herein. As shown, architecture 200 includes a SPAD circuit 202 that implements photodetector 106, a control circuit 204, a time-to-digital converter (TDC) 206, and a signal processing circuit 208. Architecture 200 may include additional or alternative components as may serve a particular implementation.

In some examples, SPAD circuit 202 includes a SPAD and a fast gating circuit configured to operate together to detect a photon incident upon the SPAD. As described herein, SPAD circuit 202 may generate an output when SPAD circuit 202 detects a photon.

The fast gating circuit included in SPAD circuit 202 may be implemented in any suitable manner. For example, the fast gating circuit may include a capacitor that is pre-charged with a bias voltage before a command is provided to arm the SPAD. Gating the SPAD with a capacitor instead of with an active voltage source, such as is done in some conventional SPAD architectures, has a number of advantages and benefits. For example, a SPAD that is gated with a capacitor may be armed practically instantaneously compared to a SPAD that is gated with an active voltage source. This is because the capacitor is already charged with the bias voltage when a command is provided to arm the SPAD. This is described more fully in U.S. Pat. Nos. 10,158,038 and 10,424,683, which are incorporated herein by reference in their entireties.

In some alternative configurations, SPAD circuit 202 does not include a fast gating circuit. In these configurations, the SPAD included in SPAD circuit 202 may be gated in any suitable manner or be configured to operate in a free running mode with passive quenching.

Control circuit 204 may be implemented by an application specific integrated circuit (ASIC) or any other suitable circuit configured to control an operation of various components within SPAD circuit 202. For example, control circuit 204 may output control logic that puts the SPAD included in SPAD circuit 202 in either an armed or a disarmed state.

In some examples, control circuit 204 may control a gate delay, which specifies a predetermined amount of time control circuit 204 is to wait after an occurrence of a light pulse (e.g., a laser pulse) to put the SPAD in the armed state. To this end, control circuit 204 may receive light pulse timing information, which indicates a time at which a light pulse occurs (e.g., a time at which the light pulse is applied to body 102). Control circuit 204 may also control a programmable gate width, which specifies how long the SPAD is kept in the armed state before being disarmed.

Control circuit 204 is further configured to control signal processing circuit 208. For example, control circuit 204 may provide histogram parameters (e.g., time bins, number of light pulses, type of histogram, etc.) to signal processing circuit 208. Signal processing circuit 208 may generate histogram data in accordance with the histogram parameters. In some examples, control circuit 204 is at least partially implemented by controller 112.

TDC 206 is configured to measure a time difference between an occurrence of an output pulse generated by SPAD circuit 202 and an occurrence of a light pulse. To this end, TDC 206 may also receive the same light pulse timing information that control circuit 204 receives. TDC 206 may be implemented by any suitable circuitry as may serve a particular implementation.

Signal processing circuit 208 is configured to perform one or more signal processing operations on data output by TDC 206. For example, signal processing circuit 208 may generate histogram data based on the data output by TDC 206 and in accordance with histogram parameters provided by control circuit 204. To illustrate, signal processing circuit 208 may generate, store, transmit, compress, analyze, decode, and/or otherwise process histograms based on the data output by TDC 206. In some examples, signal processing circuit 208 may provide processed data to control circuit 204, which may use the processed data in any suitable manner. In some examples, signal processing circuit 208 is at least partially implemented by processor 108.

In some examples, each photodetector 106 (e.g., SPAD circuit 202) may have a dedicated TDC 206 associated therewith. For example, for an array of N photodetectors 106, there may be a corresponding array of N TDCs 206. Alternatively, a single TDC 206 may be associated with multiple photodetectors 106. Likewise, a single control circuit 204 and a single signal processing circuit 208 may be provided for a one or more photodetectors 106 and/or TDCs 206.

Figure 3:
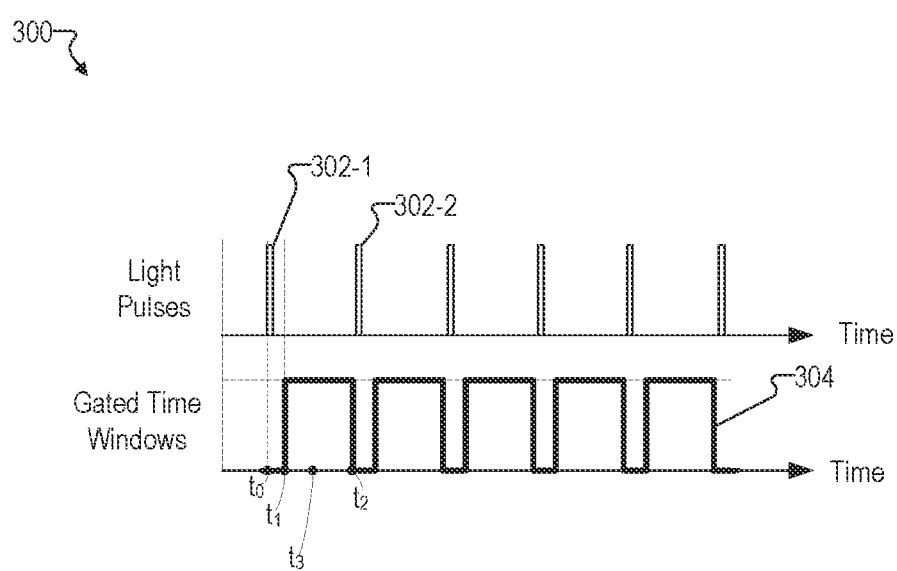
FIG. 3 illustrates an exemplary timing diagram for performing an optical measurement operation using an optical measurement system.

FIG. 3 illustrates an exemplary timing diagram 300 for performing an optical measurement operation using optical measurement system 100. The optical measurement operation may be performed in accordance with a time domain-based technique, such as TD-NIRS. Optical measurement system 100 may be configured to perform the optical measurement operation by directing light pulses (e.g., laser pulses) toward a target within a body (e.g., body 102). The light pulses may be short (e.g., 10-2000 picoseconds (ps)) and repeated at a high frequency (e.g., between 100,000 hertz (Hz) and 100 megahertz (MHz)). The light pulses may be scattered by the target and at least a portion of the scattered light may be detected by optical measurement system 100. Optical measurement system 100 may measure a time relative to the light pulse for each detected photon. By counting the number of photons detected at each time relative to each light pulse repeated over a plurality of light pulses, optical measurement system 100 may generate a histogram that represents a light pulse response of the target (e.g., a temporal point spread function (TPSF)). The terms histogram and TPSF are used interchangeably herein to refer to a light pulse response of a target.

Timing diagram 300 shows a sequence of light pulses 302 (e.g., light pulses 302-1 and 302-2) that may be applied to the target (e.g., tissue within a finger of a user, tissue within a brain of a user, blood flow, a fluorescent material used as a probe in a body of a user, etc.). Timing diagram 300 also shows a pulse wave 304 representing predetermined gated time windows (also referred as gated time periods) during which photodetectors 106 are gated ON to detect photons. As shown, light pulse 302-1 is applied at a time $t_0$. At a time $t_1$, a first instance of the predetermined gated time window begins. Photodetectors 106 may be armed at time $t_1$, enabling photodetectors 106 to detect photons scattered by the target during the predetermined gated time window. In this example, time $t_1$ is set to be at a certain time after time $t_0$, which may minimize photons detected directly from the laser pulse, before the laser pulse reaches the target. However, in some alternative examples, time $t_1$ is set to be equal to time $t_0$.

At a time $t_2$, the predetermined gated time window ends. In some examples, photodetectors 106 may be disarmed at time $t_2$. In other examples, photodetectors 106 may be reset (e.g., disarmed and re-armed) at time $t_2$ or at a time subsequent to time $t_2$. During the predetermined gated time window, photodetectors 106 may detect photons scattered by the target. Photodetectors 106 may be configured to remain armed during the predetermined gated time window such that photodetectors 106 maintain an output upon detecting a photon during the predetermined gated time window. For example, a photodetector 106 may detect a photon at a time $t_3$, which is during the predetermined gated time window between times $t_1$ and $t_2$. The photodetector 106 may be configured to provide an output indicating that the photodetector 106 has detected a photon. The photodetector 106 may be configured to continue providing the output until time $t_2$, when the photodetector may be disarmed and/or reset. Optical measurement system 100 may generate an accumulated output from the plurality of photodetectors. Optical measurement system 100 may sample the accumulated output to determine times at which photons are detected by photodetectors 106 to generate a TPSF.

As mentioned, in some alternative examples, photodetector 106 may be configured to operate in a free-running mode such that photodetector 106 is not actively armed and disarmed (e.g., at the end of each predetermined gated time window represented by pulse wave 304). In contrast, while operating in the free-running mode, photodetector 106 may be configured to reset within a configurable time period after an occurrence of a photon detection event (i.e., after photodetector 106 detects a photon) and immediately begin detecting new photons. However, only photons detected within a desired time window (e.g., during each gated time window represented by pulse wave 304) may be included in the TPSF.

Figure 4:
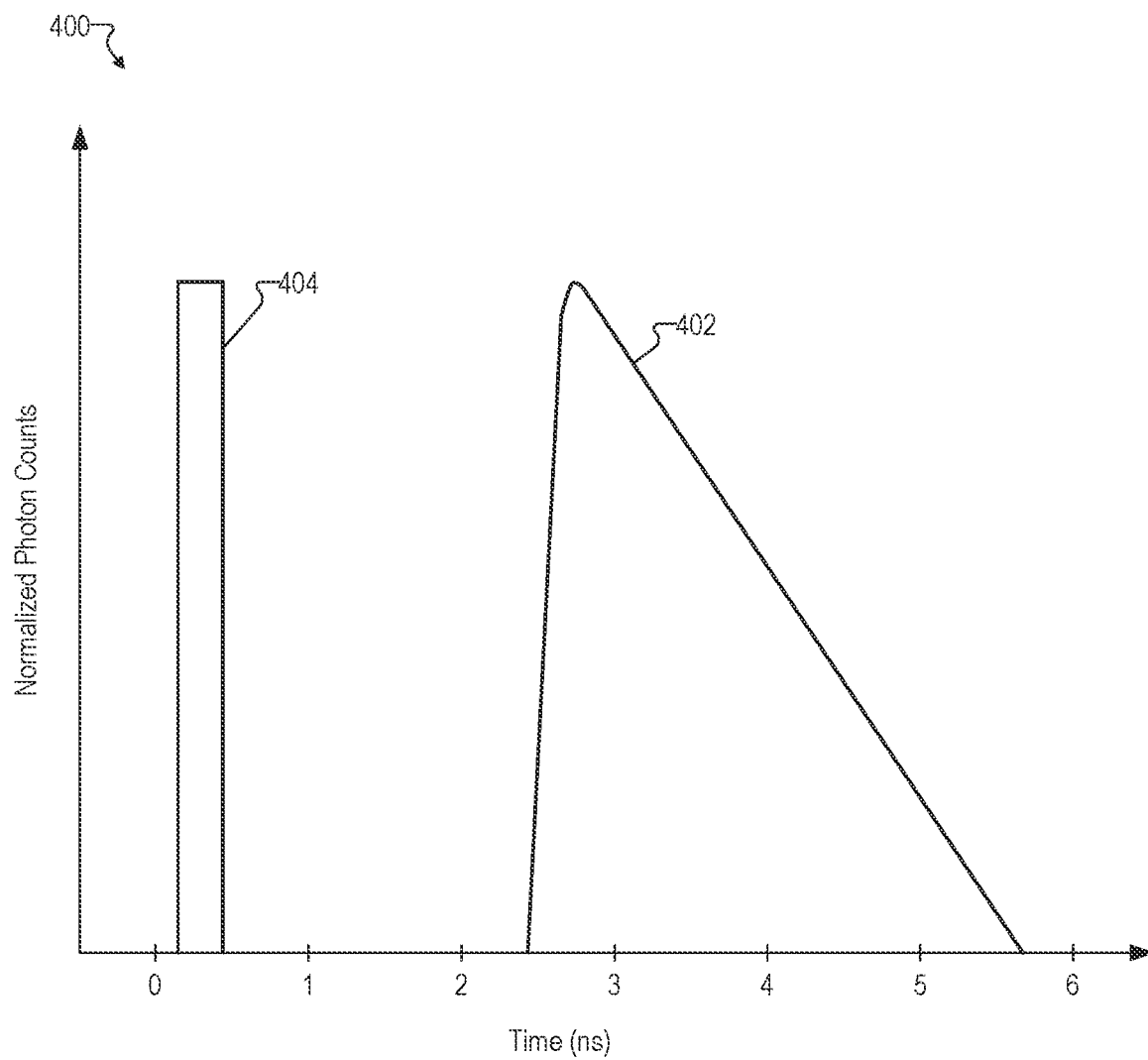
FIG. 4 illustrates a graph of an exemplary temporal point spread function that may be generated by an optical measurement system in response to a light pulse.

FIG. 4 illustrates a graph 400 of an exemplary TPSF 402 that may be generated by optical measurement system 100 in response to a light pulse 404 (which, in practice, represents a plurality of light pulses). Graph 400 shows a normalized count of photons on a y-axis and time bins on an x-axis. As shown, TPSF 402 is delayed with respect to a temporal occurrence of light pulse 404. In some examples, the number of photons detected in each time bin subsequent to each occurrence of light pulse 404 may be aggregated (e.g., integrated) to generate TPSF 402. TPSF 402 may be analyzed and/or processed in any suitable manner to determine or infer biological activity.

Figure 5:
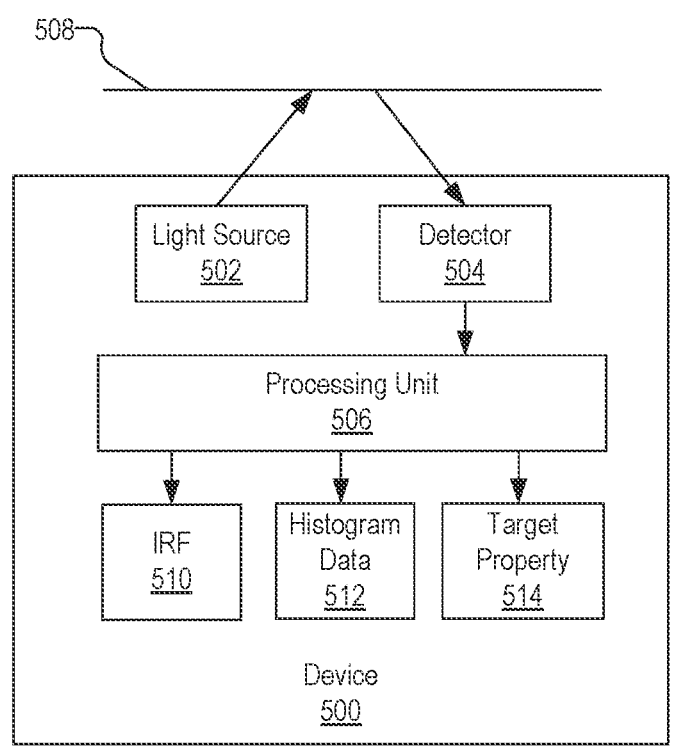
FIGS. 5-10 illustrate exemplary configurations of an optical measurement device in accordance with the systems and methods described herein.

FIG. 5 illustrates an exemplary optical measurement device 500 ("device 500") that may include an implementation of optical measurement system 100 and/or a portion of optical measurement system 100. Device 500 includes a light source 502 (e.g., an implementation of light source 110), a detector 504 (e.g., an implementation of detector 104) and a processing unit 506. Processing unit 506 may be implemented by processor 108, controller 112, control circuit 204, and/or any other suitable processing and/or computing device or circuit. An exemplary implementation of processing unit 506 is described herein.

Light source 502 may be configured to direct light (e.g., light pulses) at a target 508 (e.g., body 102). Detector 504 may be configured to detect photons of the light emitted by light source 502 after the light is scattered by target 508. Detector 504 may detect arrival times of the photons at detector 504 and provide output data to processing unit 506 indicating the arrival times. Processing unit 506 may determine an instrument response function (IRF) 510 associated with device 500 (e.g., light source 502 and/or detector 504). Processing unit 506 may further generate, based on the arrival times, histogram data 512 associated with target 508. Based on histogram data 512 and IRF 510, processing unit 506 may determine a property (e.g., target property 514) of target 508.

As described, histogram data 512 may represent a change in shape of the light pulses from light source 502 caused by passing through target 508. To determine the change, processing unit 506 may compare histogram data 512 to IRF 510, which may represent a baseline shape of the light pulse (e.g., a shape of the light pulse before passing through target 508).

An initial value for IRF 510 may be based on a measured IRF, such as during a calibration of device 500, where light pulses are directed from light source 502 directly toward detector 504 and/or reflected off of a target with a known response (e.g., an optical phantom or other surface with a known effect on the shape of the light pulses). However, IRF 510 of device 500 may change during use based on a variety of factors. For instance, IRF 510 may change based on properties associated with device 500, such as environmental properties (e.g., temperature, humidity, etc.) and/or operating parameters (e.g., current applied to light source 502, etc.). Processing unit 506 may be configured to dynamically determine IRF 510 while device 500 is in use. For instance, processing unit 506 may determine IRF 510 while device 500 is being worn by a user. IRF 510 may be determined by processing unit 506 in various ways as described herein.

Based on histogram data 512 and IRF 510, processing unit 506 may determine target property 514. Target property 514 may include one or more optical properties associated with target 508, such as an absorption coefficient ($\mu_a$) reduced scattering coefficient ($\mu_s'$), and/or any other such absolute measurements of one or more optical properties. Additionally or alternatively, target property 514 may include a biological property determined based an optical property. Such biological properties may include any suitable biological property, such as blood oxygenation, blood volume, heart rate, heart rate variability, respiratory rate, neural activity, sleep stage, etc.

Figure 6:
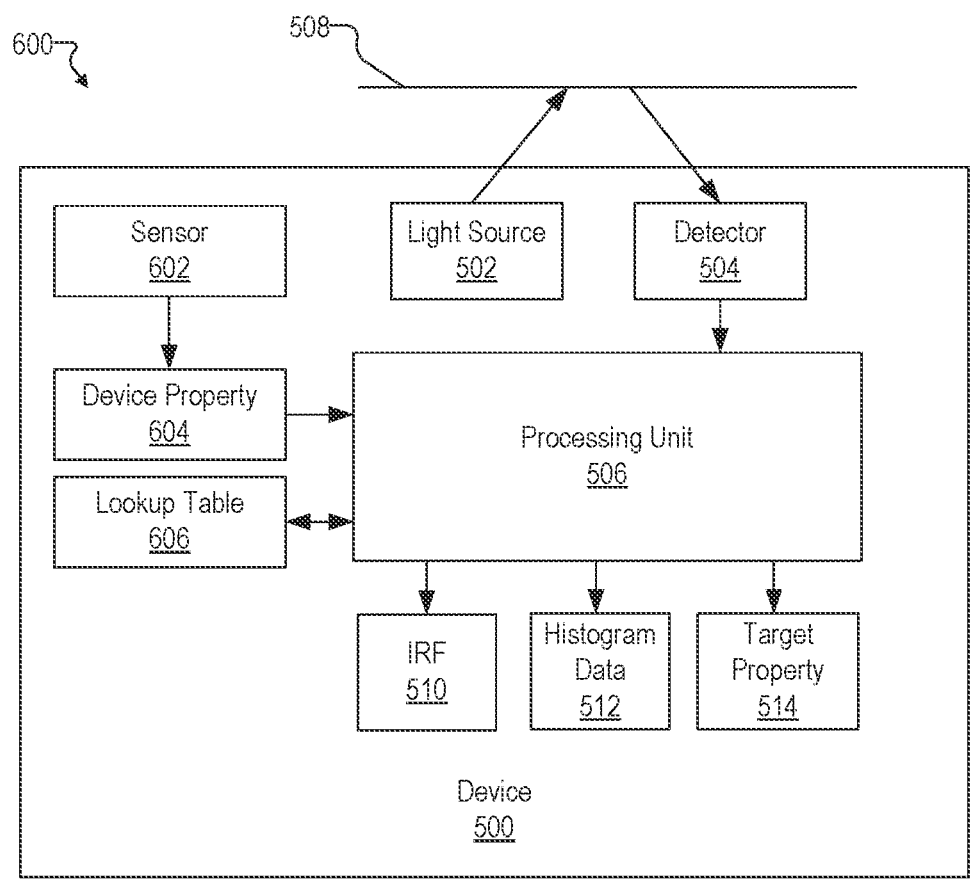

FIG. 6 illustrates an exemplary configuration 600 of device 500. In configuration 600, device 500 may include a sensor 602 that may measure a property (e.g., device property 604) associated with device 500. Device 500 may further include (e.g., store) data representative of a lookup table 606 that includes a plurality of IRFs that correspond to values of device property 604.

As one example, sensor 602 may be include a temperature sensor that may measure a temperature of device 500 (e.g., light source 502 and/or detector 504). Sensor 602 may provide a measured value of device property 604 (e.g., the temperature) to processing unit 506. Processing unit 506 may access lookup table 606 and determine, based on the value of device property 604, a corresponding IRF 510 for the measured value of device property 604. Thus, as conditions (e.g., values of device property 604) may change and consequently change the IRF of device 500, device 500 may measure the changes in device property 604 and dynamically update IRF 510 to correspond to current conditions. Using such an updated IRF 510 may provide for accurate determinations of target property 514 based on histogram data 512 and IRF 510.

Lookup table 606 may be generated in any suitable manner. For instance, device 500 may be calibrated in a controlled environment, where various values of device property 604 are produced and corresponding IRFs are measured and recorded. Each value of device property 604 and its corresponding IRF may be stored as lookup table 606. In some examples, processing unit 506 may interpolate between values and/or shapes of IRFs (e.g., an average, a weighted average, etc.) in lookup table 606 to determine IRF 510 for device 500.

Figure 7:
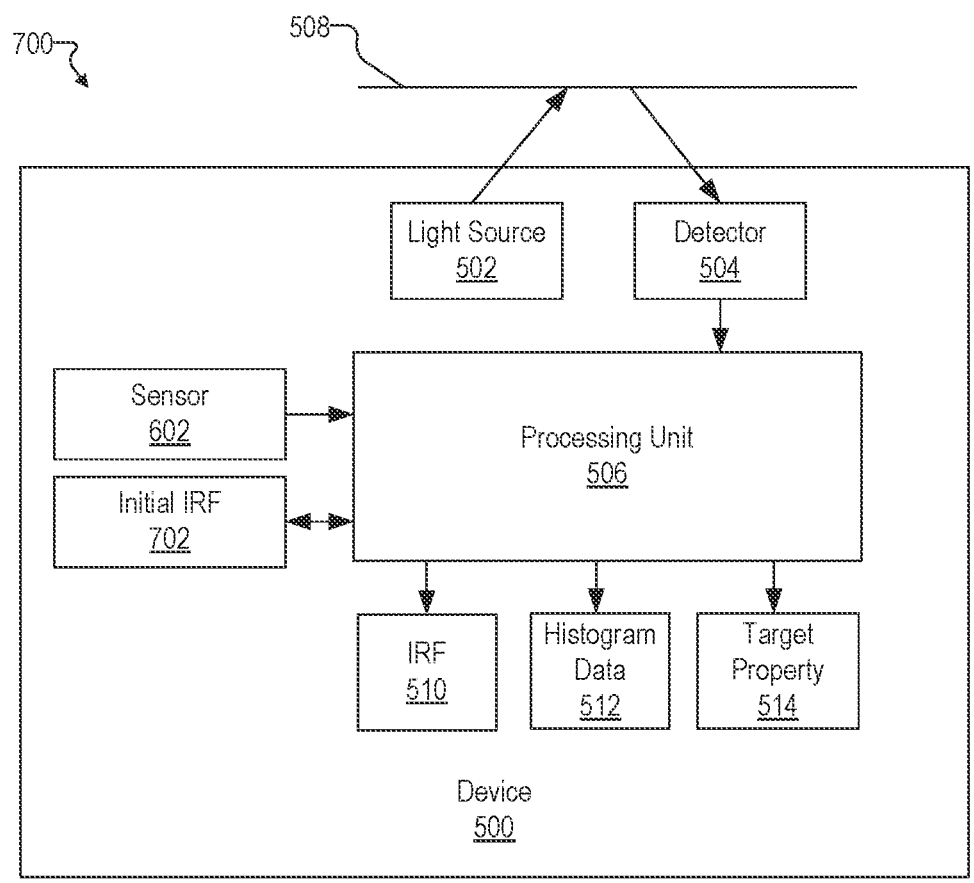

Additionally or alternatively, values of device property 604 and corresponding IRFs may be analyzed to determine patterns and/or algorithms that correlate changes in device property 604 with changes in IRF 510. For example, a machine learning algorithm may be used to determine whether particular changes in device property 604 may predict particular adjustments to IRF 510. Based on any such patterns and/or algorithms, processing unit 506 may adjust an initial IRF based on changes in device property 604 to determine IRF 510. For example, FIG. 7 shows a configuration 700 of device 500 with processing unit 506 determining values of a device property based on input from sensor 602. Processing unit 506 also accesses an initial IRF 702. Based on the change in the value of the device property from an initial value, processing unit 506 may adjust initial IRF 702 to determine IRF 510.

Figure 8:
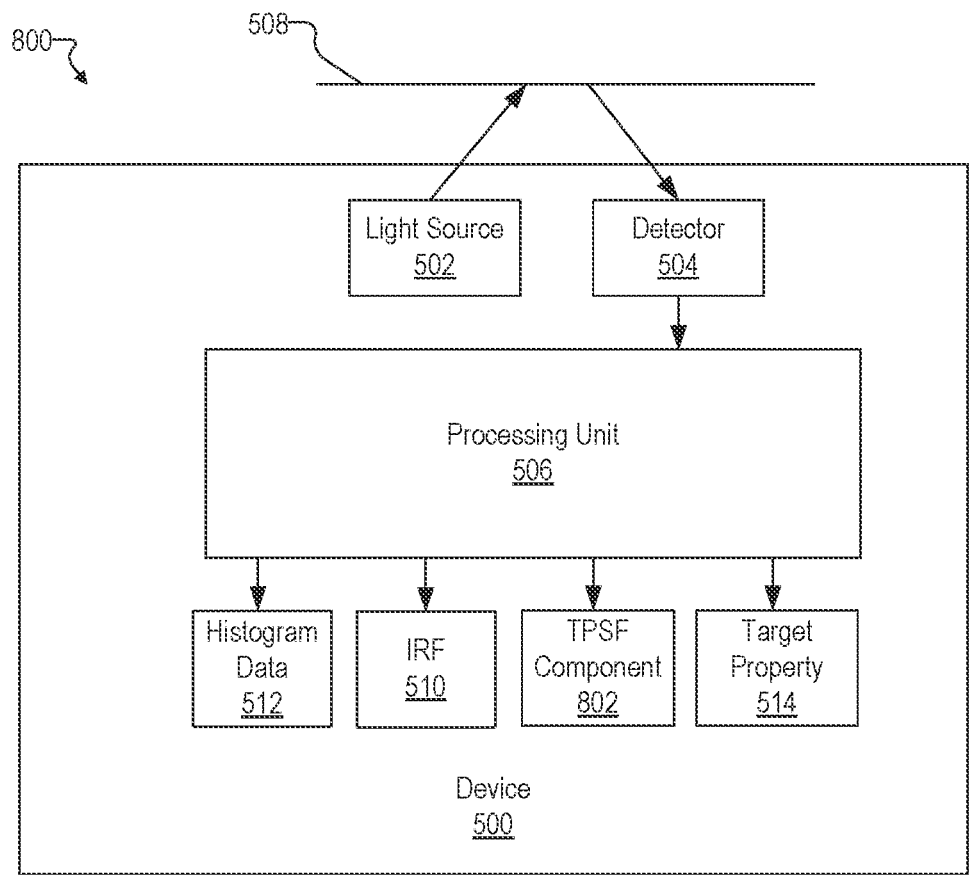

FIG. 8 illustrates another configuration 800 of device 500. Configuration 800 shows processing unit 506 generating histogram data 512 based on arrival times detected by detector 504. In configuration 800, processing unit 506 may determine IRF 510 based on histogram data 512. For example, as described, histogram data 512 may represent a change in shape of light pulses from light source 502 due to target 508. The change in shape may define a target-related TPSF component 802 of histogram data 512. Thus, histogram data 512 may be a combination of IRF 510 and target-related TPSF component 802. Therefore, processing unit 506 may generate histogram data 512 based on the arrival times detected by detector 504 and then deconvolve histogram data 512 into components, IRF 510 and TPSF component 802, to determine IRF 510. Processing unit 506 may then determine target property 514 based on histogram data 512 and IRF 510.

Processing unit 506 may deconvolve histogram data 512 into IRF 510 and TPSF component 802 in any suitable manner. For example, IRF 510 may have a set of boundary conditions into which IRF 510 will fit. Such boundary conditions may be determined based on an analysis of a wide variety of IRFs (e.g., IRFs of lookup table 606 of FIG. 6). For instance, processing unit 506 may apply principle component analysis (PCA) to lookup table 606 to determine principle IRF components of a family of shapes for IRFs. Additionally or alternatively, any other suitable machine learning algorithms may be applied to analyze a set of possible IRFs.

Similarly, TPSF component 802 may also have a set of boundary conditions into which TPSF component 802 will fit. Such boundary conditions may similarly be determined, such as applying PCA to a set of possible TPSF components to determine principle TPSF components. Further, foreknowledge of target property 514 may provide additional expected characteristics of TPSF component 802. For example, if target property 514 includes a heart rate, TPSF component 802 may include a rhythmic variation.

Consequently, IRF 510 and TPSF component 802 may either or both fall within a threshold amount of some expected shape. This information may constrain variables to allow processing unit 506 to deconvolve histogram data 512 into IRF 510 and TPSF component 802. In some examples, processing unit may include additional variables and/or components in deconvolving histogram data 512, such as noise, a scaling factor contributed by an epidermis of the user, and any other such suitable variables and/or components. Deconvolving may include an inverse operation of any suitable convolution, where a mathematical operation may be performed on two functions to determine a third function. Thus, the third function (e.g., histogram data 512) may be deconvolved to determine the first and/or second functions (e.g., IRF 510 and TPSF component 802).

Additionally or alternatively, a plurality of histograms of histogram data 512 may be combined or otherwise analyzed together to provide additional information for deconvolving histogram data 512. For instance, changes in TPSF component 802 may have one or more characteristics that are different from changes expected in IRF 510. For example, changes in TPSF component 802 may be more rhythmic, more frequent, of a lesser magnitude, etc. than changes in IRF 510. Consequently, combining histograms of histogram data 512 (e.g., averaging, determining a mean, determining a median, filtering, etc.) may allow processing unit 506 to minimize effects of TPSF component 802 to determine IRF 510. In some examples of such an analysis, TPSF component 802 may be disregarded for a calibration period to determine IRF 510. As a result, target property 514 may not be determined during such a calibration period. In such examples, once the calibration period is concluded, the determined IRF 510 may be fixed for a measurement period to determine target property 514 based on histogram data 512 and IRF 510. Calibration and measurement periods may be of any suitable length of time.

Figure 9:
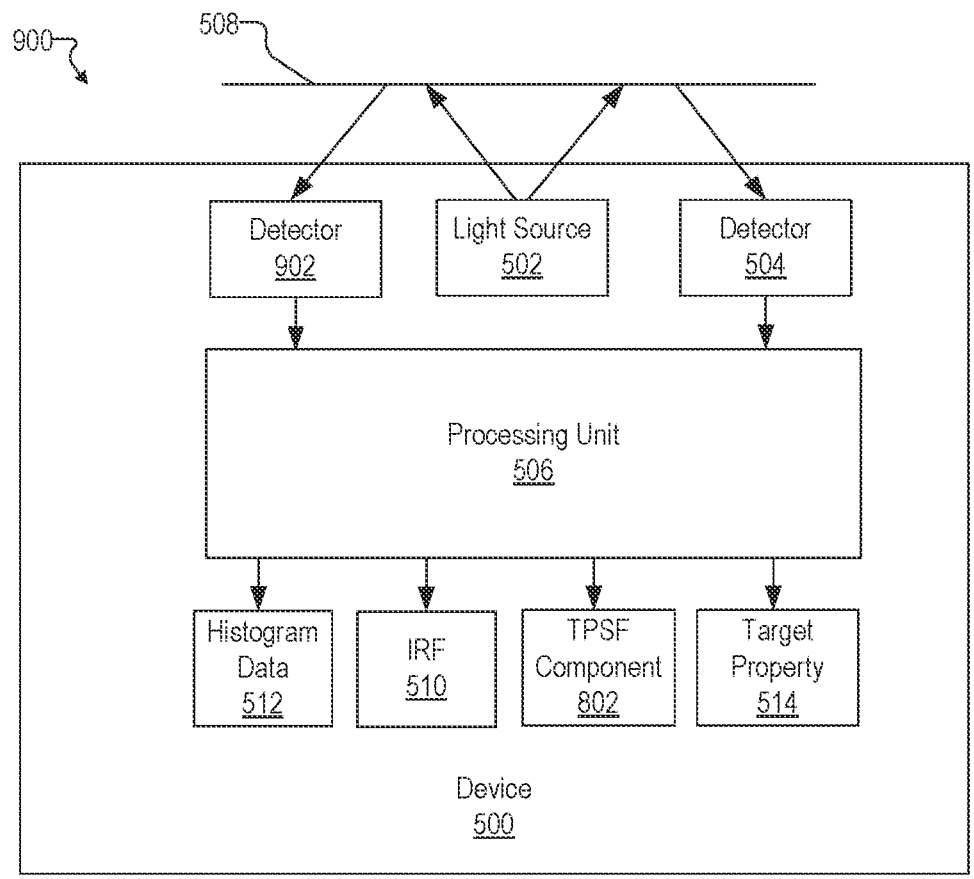

FIG. 9 illustrates another configuration 900 of device 500. Configuration 900 may be similar to configuration 800 except configuration 900 shows another detector 902. Detector 902 may be similar to detector 504, configured to detect arrival times of photons of light pulses emitted by light source 502 and scattered by target 508. As detector 902 is configured to detect light pulses from light source 502 along with detector 504, an IRF associated with detector 902 may be substantially similar to an IRF associated with detector 504.

Having multiple similar IRFs from multiple detectors (e.g., detector 504 and detector 902) may provide processing unit 506 additional constraints for deconvolving histogram data (e.g., histogram data 512) into an IRF (e.g., IRF 510) and a TPSF component (e.g., TPSF component 802).

Figure 10:
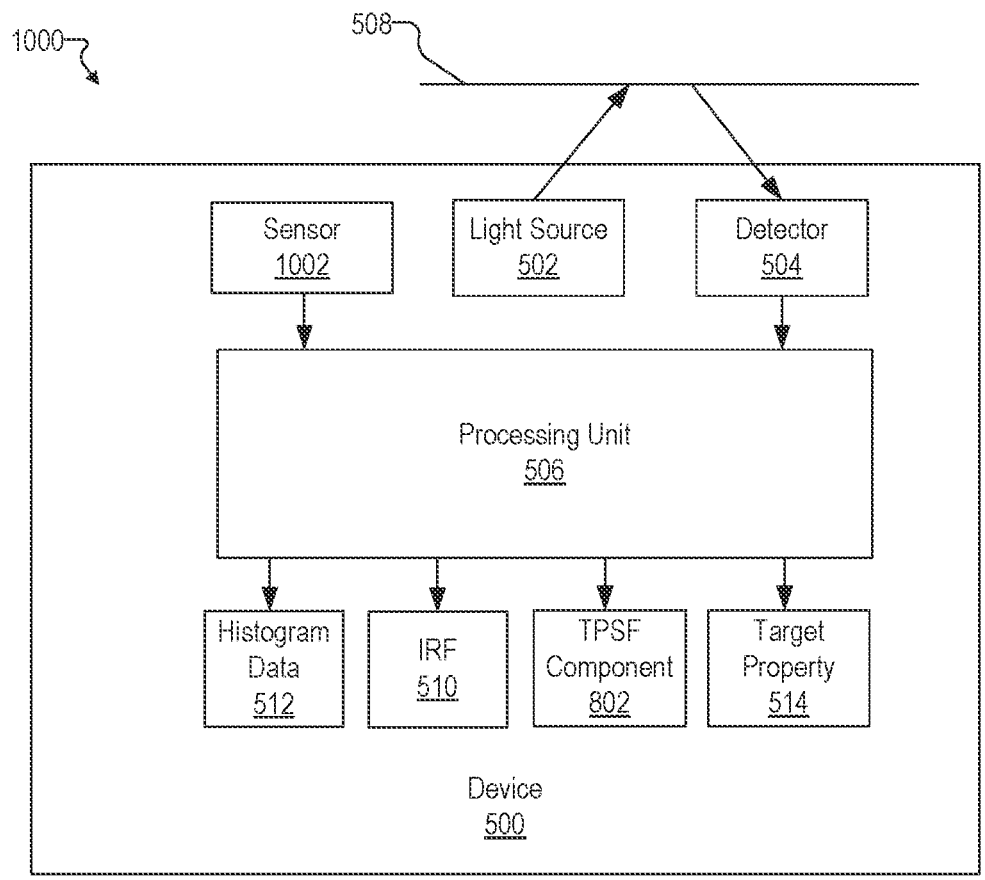

FIG. 10 illustrates another configuration 1000 of device 500. Configuration 1000 may be similar to configuration 800 except configuration 1000 includes a sensor 1002. Sensor 1002 may be configured to provide data to processing unit 506 so that processing unit 506 may determine a quiescent period of a user (e.g., a period of time when the user is relatively still) of device 500. As the user is relatively still during the quiescent period, variations in histograms of histogram data 512 may be relatively minimal, as underlying properties of the user (e.g., optical properties, biological properties) may be varying less. Based on such assumptions of the quiescent period, processing unit 506 may analyze histogram data 512 to determine IRF 510.

The quiescent period may be determined in any suitable manner. For instance, the quiescent period may be determined based on sensor data from sensor 1002 (e.g., inertial sensors or any other suitable sensors) and/or data from external sensors such as sensors associated with a phone, a smart watch, a fitness tracker, etc. Additionally or alternatively, such a period may be determined based on histogram data 512. For example, processing unit 506 may analyze histogram data 512 and determine that a variation in histograms across the period of time is within a threshold amount of variation, which may indicate that the user is being relatively still.

As device 500 may be configured to generate light pulses and corresponding histograms at a relatively high rate, the length of the quiescent period may be relatively short (e.g., one or several seconds) that device 500 may need to generate a sufficient number of histograms to determine IRF 510. The relatively short time period may also result in minimal changes in IRFs during the quiescent period, as device properties may be relatively stable during such short time scales. Such minimal changes may enable processing unit 506 to accurately determine IRF 510 while device 500 is in use.

While various ways of determining IRF 510 have been described with reference to various configurations of device 500, any of the configurations and/or methods may be used in any suitable combination. Additionally, the determining of IRF 510 may be performed at any suitable times while the user is wearing device 500. For example, IRF 510 may be determined continually and/or periodically. Additionally or alternatively, a determination of IRF 510 may be triggered by any suitable prompt, such as a change in a device property, a change in histogram data 512 beyond a predetermined threshold, a determination of a quiescent period, a user input, etc. Additionally or alternatively, the times for determination of IRF 510 may be based on an expected or actual environment and/or application of device 500.

Figure 11:
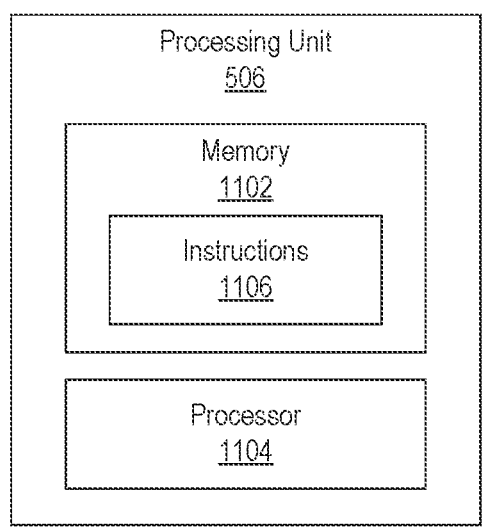
FIG. 11 illustrates an exemplary implementation of a processing unit.

FIG. 11 illustrates an exemplary implementation of processing unit 506 in which processing unit 506 includes a memory 1102 and a processor 1104 configured to be selectively and communicatively coupled to one another. In some examples, memory 1102 and processor 1104 may be distributed between multiple devices and/or multiple locations as may serve a particular implementation.

Memory 1102 may be implemented by any suitable non-transitory computer-readable medium and/or non-transitory processor-readable medium, such as any combination of non-volatile storage media and/or volatile storage media. Exemplary non-volatile storage media include, but are not limited to, read-only memory, flash memory, a solid-state drive, a magnetic storage device (e.g., a hard drive), ferroelectric random-access memory ("RAM"), and an optical disc. Exemplary volatile storage media include, but are not limited to, RAM (e.g., dynamic RAM).

Memory 1102 may maintain (e.g., store) executable data used by processor 1104 to perform one or more of the operations described herein. For example, memory 1102 may store instructions 1106 that may be executed by processor 1104 to perform any of the operations described herein. Instructions 1106 may be implemented by any suitable application, program (e.g., sound processing program), software, code, and/or other executable data instance. Memory 1102 may also maintain any data received, generated, managed, used, and/or transmitted by processor 1104.

Processor 1104 may be configured to perform (e.g., execute instructions 1106 stored in memory 1102 to perform) various operations described herein. For example, processor 1104 may be configured to perform any of the operations described herein as being performed by processing unit 506.

In some examples, processing unit 506 may be included in the same wearable device that includes light source 502 and detectors 504. Alternatively, processing unit 506 is not included in the same wearable device that includes light source 502 and detector 504. For example, processing unit 506 may be implemented by a stand-alone computing device (e.g., a smart phone, laptop, etc.) communicatively coupled to the wearable device by way of one or more communication interfaces (e.g., cables, wireless interfaces, etc.).

Figure 12:
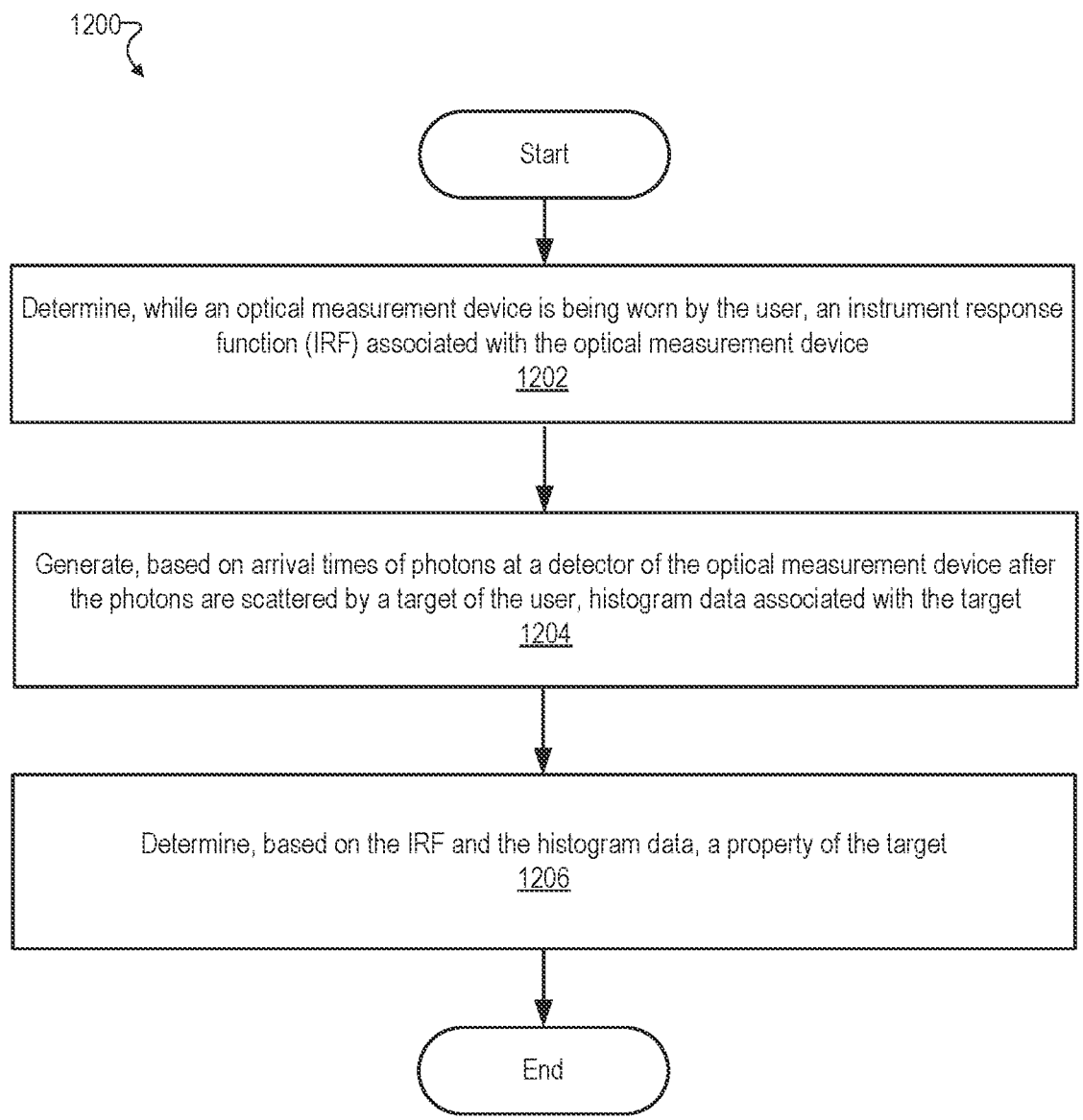
FIG. 12 illustrates an exemplary method.

FIG. 12 illustrates an exemplary method 1200 that may be performed by processing unit 506 and/or any implementation thereof. While FIG. 12 illustrates exemplary operations according to one embodiment, other embodiments may omit, add to, reorder, and/or modify any of the operations shown in FIG. 12. Each of the operations shown in FIG. 12 may be performed in any of the ways described herein.

At operation 1202, a processing unit of an optical measurement device determines, while the optical measurement device is being worn by a user, an instrument response function (IRF) associated with the optical measurement device.

At operation 1204, the processing unit generates, based on arrival times of photons at a detector of the optical measurement device after the photons are scattered by a target of the user, histogram data associated with the target.

At operation 1206, the processing unit determines, based on the absolute optical property, a blood oxygenation level of the user.

An illustrative optical measurement device includes a light source configured to emit light pulses directed at a target of a user. The optical measurement device further includes a detector configured to detect arrival times for photons of the light pulses after the photons are scattered by the target. The optical measurement device further includes a processing unit configured to determine, while the optical measurement device is being worn by the user, an instrument response function (IRF) associated with the optical measurement device. The processing unit is further configured to generate, based on the arrival times of the photons at the detector, histogram data associated with the target. The processing unit is further configured to determine, based on the IRF and the histogram data, a property of the target.

An illustrative system includes a memory storing instructions and a processor communicatively coupled to the memory and configured to execute the instructions to determine, while an optical measurement device is being worn by a user, an instrument response function (IRF) associated with the optical measurement device. The processor is further configured to execute the instructions to generate, based on arrival times of photons at a detector of the optical measurement device after the photons are scattered by a target of the user, histogram data associated with the target. The processor is further configured to execute the instructions to determine, based on the IRF and the histogram data, a property of the target.

An illustrative method includes determining, by a processing unit of an optical measurement device, while the optical measurement device is being worn by a user, an instrument response function (IRF) associated with the optical measurement device. The method further comprises generating, by the processing unit, based on arrival times of photons at a detector of the optical measurement device after the photons are scattered by a target of the user, histogram data associated with the target. The method further comprises determining, by the processing unit, based on the IRF and the histogram data, a property of the target.

An illustrative non-transitory computer-readable medium stores instructions that, when executed, direct a processor of a computing device to determine, while an optical measurement device is being worn by a user, an instrument response function (IRF) associated with the optical measurement device. The instructions further direct the processor to generate, based on arrival times of photons at a detector of the optical measurement device after the photons are scattered by a target of the user, histogram data associated with the target. The instructions further direct the processor to determine, based on the IRF and the histogram data, a property of the target.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An optical measurement device configured to be worn by a user, the device comprising:
a light source configured to emit light directed at a target of the user;
a detector configured to detect arrival times for photons of the light after the photons are scattered by the target; and
a processing unit configured to:
determine, while the optical measurement device is being worn by the user, an instrument response function (IRF) associated with the optical measurement device, the determining the IRF comprising measuring a property associated with the optical measurement device while the optical measurement device is being worn by the user and determining the IRF based on the property associated with the optical measurement device,
generate, based on the arrival times of the photons at the detector, histogram data associated with the target, and
determine, based on the IRF and the histogram data, a property of the target.

2. The optical measurement device of claim 1, wherein the determining the IRF further comprises accessing a lookup table including IRFs corresponding to values of the property associated with the optical measurement device.

3. The optical measurement device of claim 1, wherein the determining the IRF based on the property associated with the optical measurement device comprises adjusting an initial IRF based on a change in the property associated with the optical measurement device.

4. The optical measurement device of claim 1, wherein the property associated with the optical measurement device comprises a temperature of one or more components of the optical measurement device.

5. The optical measurement device of claim 1, wherein the property associated with the optical measurement device comprises a property associated with an environment of the optical measurement device.

6. The optical measurement device of claim 1, wherein the property associated with the optical measurement device comprises an operating parameter of the optical measurement device.

7. The optical measurement device of claim 6, wherein the operating parameter comprises a current applied to the light source.

8. The optical measurement device of claim 1, wherein the determining the IRF is further based on a plurality of properties associated with the optical measurement device.

9. The optical measurement device of claim 1, wherein the determining the IRF further comprises deconvolving, based on a set of principle IRF components and a set of principle target-related temporal point spread function (TPSF) components, the histogram data to determine the IRF and the target-related TPSF.

10. The optical measurement device of claim 9, wherein the determining the IRF further comprises combining a plurality of histograms of the histogram data for deconvolving.

11. The optical measurement device of claim 9, wherein the determining the IRF further comprises determining histograms of the histogram data for deconvolving that are associated with a quiescent period of the user.

12. The optical measurement device of claim 9, wherein:
the processing unit is further configured to generate additional histogram data based on additional arrival times of photons of the light emitted by the light source and scattered by the target, the additional arrival times detected by an additional detector; and
the determining the IRF further comprises deconvolving the additional histogram data to determine an additional IRF that is substantially similar to the IRF.

13. The optical measurement device of claim 9, wherein the determining the IRF further comprises minimizing, during a calibration period, the target-related TPSF component.

14. A system comprising:
a memory storing instructions; and
a processor communicatively coupled to the memory and configured to execute the instructions to:
determine, while an optical measurement device is being worn by a user, an instrument response function (IRF) associated with the optical measurement device, the determining the IRF comprising measuring a property associated with the optical measurement device while the optical measurement device is being worn by the user and determining the IRF based on the property associated with the optical measurement device,
generate, based on arrival times of photons at a detector of the optical measurement device after the photons are scattered by a target of the user, histogram data associated with the target, and
determine, based on the IRF and the histogram data, a property of the target.

15. The system of claim 14, wherein the determining the IRF based on the property associated with the optical measurement device comprises accessing a lookup table including IRFs corresponding to values of the property associated with the optical measurement device.

16. The system of claim 14, wherein the determining the IRF based on the property associated with the optical measurement device comprises adjusting an initial IRF based on a change in the property associated with the optical measurement device.

17. The system of claim 14, wherein the property associated with the optical measurement device comprises a temperature of one or more components of the optical measurement device.

18. The system of claim 14, wherein the property associated with the optical measurement device comprises a property associated with an environment of the optical measurement device.

19. The system of claim 14, wherein the property associated with the optical measurement device comprises an operating parameter of the optical measurement device.

20. The system of claim 19, wherein the operating parameter comprises a current applied to a light source of the photons.

21. The system of claim 14, wherein the determining the IRF is further based on a plurality of properties associated with the optical measurement device.

22. The system of claim 14, wherein the determining the IRF comprises deconvolving, based on a set of principle IRF components and a set of principle target-related temporal point spread function (TPSF) components, the histogram data to determine the IRF and the target-related TPSF.

23. The system of claim 22, wherein the determining the IRF further comprises combining a plurality of histograms of the histogram data for deconvolving.

24. The system of claim 22, wherein the determining the IRF further comprises determining histograms of the histogram data for deconvolving that are associated with a quiescent period of the user.

25. The system of claim 22, wherein:
the processor is further configured to generate additional histogram data based on additional arrival times of photons scattered by the target, the additional arrival times detected by an additional detector; and
the determining the IRF further comprises deconvolving the additional histogram data to determine an additional IRF that is substantially similar to the IRF.

26. The system of claim 22, wherein the determining the IRF further comprises minimizing, during a calibration period, the target-related TPSF component.

27. A method comprising:
determining, by a processing unit of an optical measurement device, while the optical measurement device is being worn by a user, an instrument response function (IRF) associated with the optical measurement device, the determining the IRF comprising measuring a property associated with the optical measurement device while the optical measurement device is being worn by the user and determining the IRF based on the property associated with the optical measurement device,
generating, by the processing unit, based on arrival times of photons at a detector of the optical measurement device after the photons are scattered by a target of the user, histogram data associated with the target, and
determining, by the processing unit, based on the IRF and the histogram data, a property of the target.

28. A non-transitory computer-readable medium storing instructions that, when executed, direct a processor of a computing device to:
determine, while an optical measurement device is being worn by a user, an instrument response function (IRF) associated with the optical measurement device, the determining the IRF comprising measuring a property associated with the optical measurement device while the optical measurement device is being worn by the user and determining the IRF based on the property associated with the optical measurement device,
generate, based on arrival times of photons at a detector of the optical measurement device after the photons are scattered by a target of the user, histogram data associated with the target, and
determine, based on the IRF and the histogram data, a property of the target.

* * * * *